US008508493B2

(12) United States Patent
Souchkov (10) Patent No.: US 8,508,493 B2
(45) Date of Patent: Aug. 13, 2013

(54) REDUCTION OF ELECTROMAGNETIC INTERFERENCE IN A CAPACITIVE TOUCHSCREEN SYSTEM

(75) Inventor: Vitali Souchkov, Walnut Creek, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 628 days.

(21) Appl. No.: 12/819,453

(22) Filed: Jun. 21, 2010

(65) Prior Publication Data

US 2011/0310051 A1    Dec. 22, 2011

(51) Int. Cl.
*G06F 3/041*    (2006.01)
(52) U.S. Cl.
USPC .................. 345/173; 345/174; 345/520
(58) Field of Classification Search
USPC .......................................... 345/173, 174, 520
See application file for complete search history.

(56) References Cited

U.S. PATENT DOCUMENTS

| 5,543,588 | A | 8/1996 | Bisset |
| 5,861,875 | A | 1/1999 | Gerpheide |
| 6,998,545 | B2 | 2/2006 | Harkcom et al. |
| 2003/0058226 | A1 | 3/2003 | Bertram et al. |
| 2004/0004488 | A1 | 1/2004 | Baxter |
| 2007/0120831 | A1 | 5/2007 | Mahowald et al. |
| 2007/0242055 | A1* | 10/2007 | Lai .................................. 345/173 |
| 2009/0085894 | A1* | 4/2009 | Gandhi et al. ................. 345/175 |
| 2009/0096758 | A1* | 4/2009 | Hotelling et al. ............. 345/173 |
| 2009/0273573 | A1* | 11/2009 | Hotelling ....................... 345/173 |
| 2010/0271319 | A1* | 10/2010 | Goo et al. ...................... 345/173 |
| 2011/0210941 | A1* | 9/2011 | Reynolds et al. ............. 345/174 |
| 2012/0038581 | A1* | 2/2012 | Hotelling et al. ............. 345/173 |
| 2012/0105371 | A1* | 5/2012 | Hotelling et al. ............. 345/174 |

OTHER PUBLICATIONS

Reducing Analog Input Noise in Touch Screen Systems, Texas Instruments, Wendy Fang, Jul. 2007.

* cited by examiner

*Primary Examiner* — Thuy Pardo
(74) *Attorney, Agent, or Firm* — Winston Hsu; Scott Margo (57) ABSTRACT

Disclosed herein are various embodiments of circuits and methods for reducing electromagnetic interference in mutual capacitance measurement or sensing systems, devices, components and methods such as capacitive touchscreens. Charge integrator circuits and switched capacitance filtering circuits are disclosed that improve the signal-to-noise ratio (or the ratio of a desired sensed mutual capacitance signal to an undesired EMI signal) in a capacitive sensor readout circuit without the need to increase the amplitude of the drive signal. The various embodiments of the charge integrator and switched capacitance filtering circuits described herein permit an improvement in noise immunity without requiring the excessive power levels typically associated with high amplitude drive circuitry, and moreover result in boosting signal-to-noise ratios during early stages of signal processing.

40 Claims, 9 Drawing Sheets

REDUCTION OF ELECTROMAGNETIC INTERFERENCE IN A CAPACITIVE TOUCHSCREEN SYSTEM

FIELD OF THE INVENTION

Various embodiments of the invention described herein relate to the field of capacitive sensing devices generally, and more specifically to circuits and methods for reducing or filtering electromagnetic interference in mutual capacitance measurement or sensing systems, devices, components and methods such as capacitive touchscreens.

BACKGROUND

Two principal capacitive sensing and measurement technologies are, currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured-through the detection of the amount of charge accumulated on an object held at a givens voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded, object is a finger. The human body is essentially a capacitor toe surface where the electric field vanishes, and typically has a capacitance of around 100 pF.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In a capacitive touchscreen, a user's finger represents an electrode connected to an electric field ground. Due to the widespread use of switching power supply converters to power capacitive touchscreens, the electric potential of a readout electronic ground terminal (or system-ground) may vary significantly in periodic or not strictly periodic fashion with respect to the voltage associated with the electric field ground. The electric field voltage or potential is assumed to be zero at infinity. Variation of the system ground voltage with respect to the electric field ground voltage may produce significant interference in mutual capacitance signals acquired from a capacitive touchscreen, which we refer to here generically as electromagnetic interference. Such interference. Can be considered as "noise" due to the generally unknown phase relationships between a readout sampling clock a swathing power supply converter block. Other contributions to electromagnetic interference can include "noise" coupling associated with undesired charges induced in the human body and the touchscreen by various ambient or environmental sources that may be asynchronous with respect to capacitive touchscreen drive signals.

What is needed is a capacitive touchscreen system capable of reducing or otherwise filtering the effects of electromagnetic interference.

SUMMARY

In one embodiment, there is, a provided a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devisees brought into proximity thereto, at least one drive circuit operably connected to the first plurality of electrodes and configured to provide drive signals of high and low states thereto, a plurality of sense circuits, one each of the sense circuits being operably connected to corresponding ones of the second plurality of electrodes, a system ground associated with the capacitive touchscreen system, an electric-field ground associated with the one or more fingers or touch devices and the touchscreen, wherein each of the sense circuits comprises a charge integrator circuit and a switched capacitance filtering circuit, the charge integrator circuit being configured to receive input signals provided by a corresponding one of the second plurality of electrodes and to provide integrated signals to the switched capacitance filtering circuit, the switched capacitance filtering circuit being configured to sample and store in first and second capacitors, respectively, first and second integrated signals delivered thereto by the charge integrator circuit where the first integrated signal corresponds to the high state drive signal, and the second integrated signal corresponds to the low state drive signal, the switched capacitance filtering circuit being configured to provide an output signal representative of the mutual capacitance of the one of the second plurality of electrodes corresponding to the sense circuit and further having an electromagnetic interference voltage between the system ground and the electric field ground substantially filtered therefrom by the switched capacitance filtering circuit.

In another embodiment, there is provided a processor for a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities, of electrodes intersect, such mutual capacitances changing in the presence of one or more fingers or touch devices brought into proximity thereto, a system ground being associated with the capacitive touchscreen system, an electric field ground being associated with the one or more fingers or touch devices and the touchscreen, the processor comprising at least one drive circuit operably connected to the first plurality of electrodes and configured to provide drive signals of high and low states thereto, a plurality of sense circuits, one each of the sense circuits being operably connected to corresponding ones of the second plurality of electrodes, wherein each of the sense circuits comprises a charge integrator circuit and a switched capacitance filtering circuit the charge integrator circuit being configured to receive input signals provided by a corresponding one of the second plurality of electrodes and to provide integrated signals to the switched capacitance filtering circuit, the switched capacitance filtering circuit being configured to sample and store in first and second capacitors, respectively, first and second integrated signals delivered thereto by the charge integrator circuit, where the first integrated signal corresponds to the high state drive signal, and the second integrated signal corresponds to the low state drive signal, the switched capacitance filtering circuit being configured to provide an output signal representative, of the mutual capacitance of the one of the second plurality of electrodes corresponding to the sense circuit and further having an electromagnetic interference voltage between the system ground and the electric field ground substantially filtered therefrom by, the switched capacitance filtering circuit.

In still another embodiment there is provided a method of reducing electromagnetic interference in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devices brought into proximity thereto, a system ground being associated with the capacitive touchscreen system, an electric field ground being associated with the one or more fingers or touch devices and the touchscreen, the method comprising sequentially driving the first plurality of electrodes with alternating high and low state drive signals, sensing the mutual capacitances associated with each of the second plurality of electrodes during the high and low state drive signals with a charge integrator circuit for each sense circuit, for each charge integrator circuit, providing first and second integrated signals corresponding to the high and low state drive signals, respectively, to a switched capacitance filtering circuit, sampling and storing in first and, second capacitors, respectively, of the switched capacitance filtering circuit the first and second integrated signals, providing, with the switched capacitance filtering circuit, an output signal representative of the mutual capacitance of the one of the second plurality of electrodes corresponding to the sense circuit and further having an electromagnetic interference voltage between the system ground and the electric field ground substantially filtered therefrom by the switched capacitance filtering circuit.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
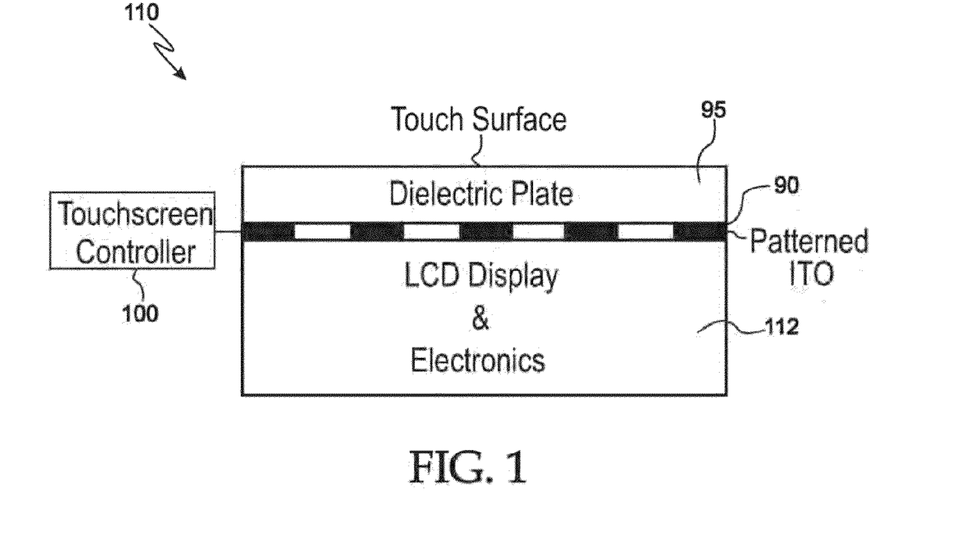
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, microprocessor, application specific integrated circuit ("ASIC") or CPU 100. Note that image displays other than LCDs or OLEDs may be disposed beneath display 112.

Figure 2:
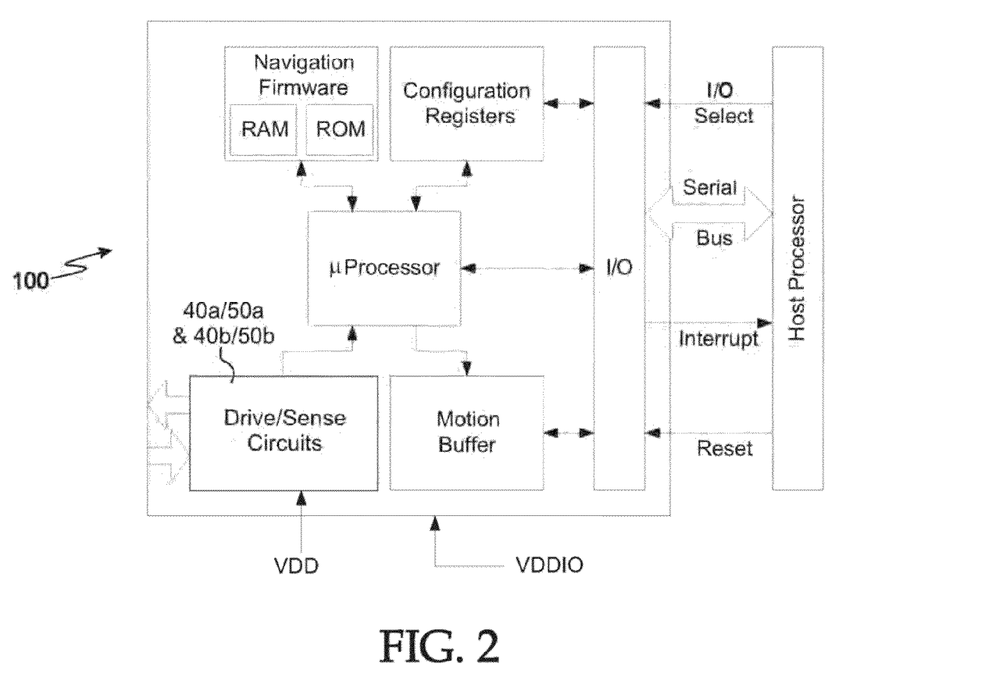
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
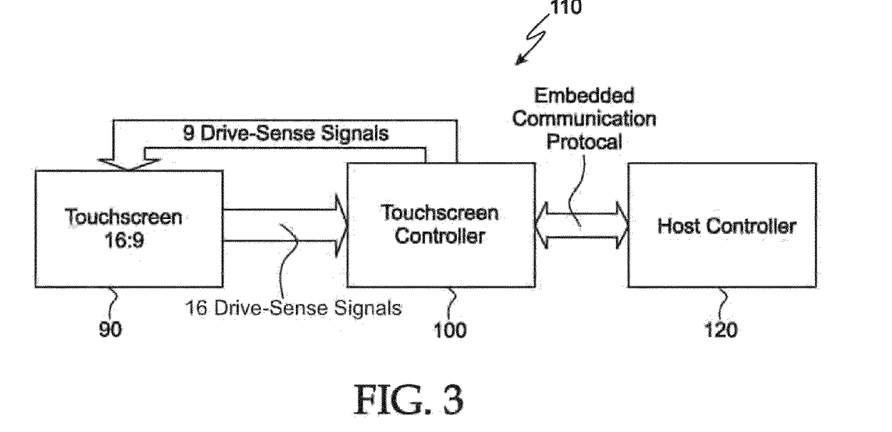
FIG. 3 shows one embodiment of a block diagram of a capacitive touchscreen system and a host controller.
Figure 4:
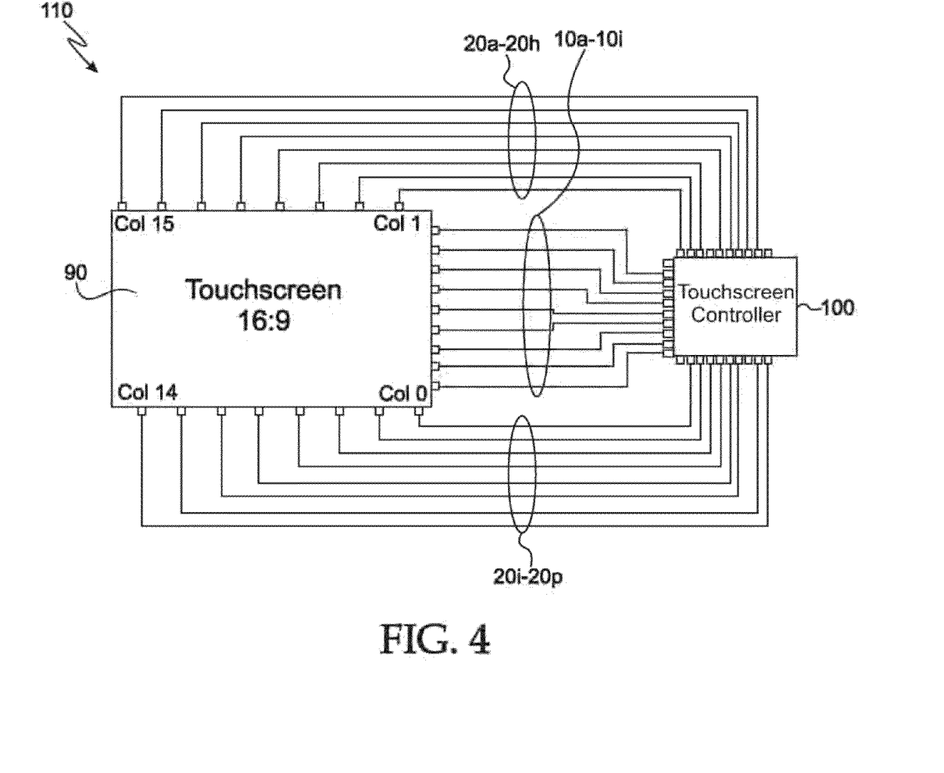
FIG. 4 shows a schematic block diagram of one embodiment of a capacitive lei touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the uses body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 sense and drive signal lines and 16 drive and sense lines connected to an ITO grid on a touchscreen. Touchscreen controller 100 applies an excitation such as a square wave, meander signal or other suitable type of drive signal to the drive electrodes that may have a is frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

According to one embodiment, and as shown in FIG. 4, an ITO grid can be employed on touchscreen 90, and comprises rows 20a-20p and columns 10a-10i, where rows 20a-20p are operably connected to sense circuits and columns 10a-101 are operably connected to drive circuits. FIG. 4 illustrates one configuration for routing ITO or other drive and sense lines to touchscreen controller 100. Rows and columns for sense and drive lines are interchangeable.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
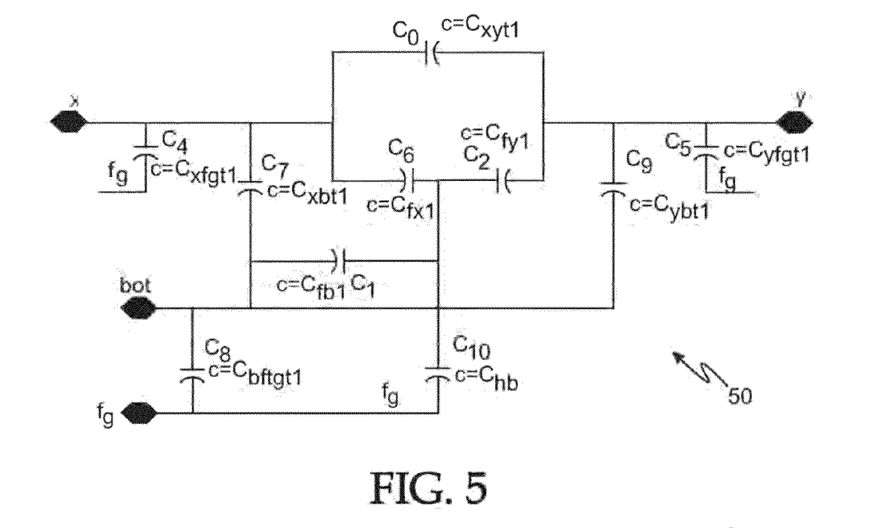
FIG. 5 shows one embodiment of a, touch sensor pixel circuit in the presence of a finger touch.
Figure 6:
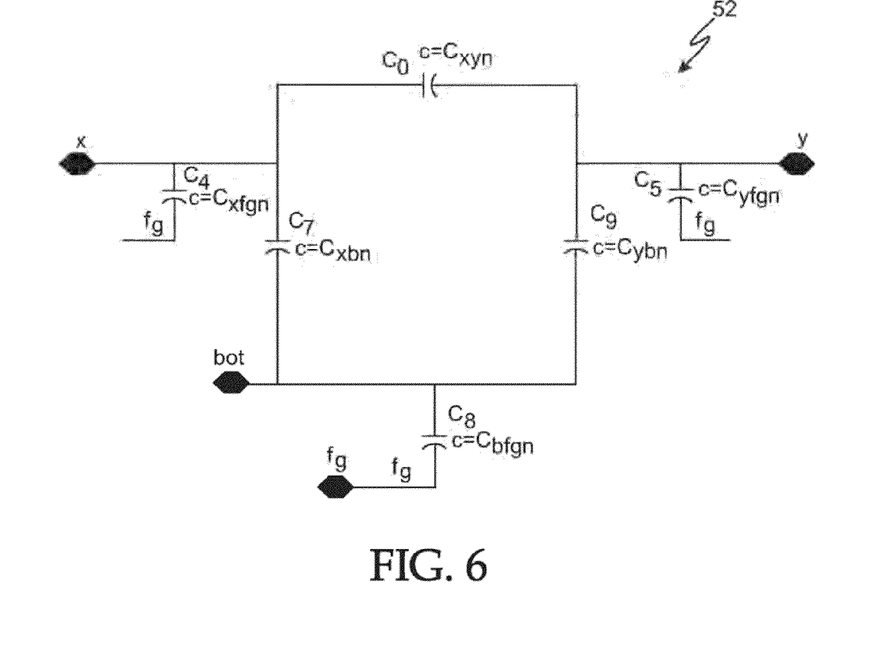
FIG. 6 shows one embodiment off-a touch sensor pixel circuit in the absence of a finger touch.

Referring now to FIGS. 5 and 6, there are shown capacitive network circuits 50 and 52 representing an individual pixel sensor in a mutual capacitance touchscreen, where in FIG. 5 the touchscreen is subjected to a finger touch by a user, and in FIG. 6 the touchscreen is not touched by a user. A typical touchscreen comprises many such circuits, each pair of circuits representing intersections of sense and drive lines. In a touched pixel sensor, a finger electrode is connected to an electric field ground by a human body capacitor $C_{hb}$, which typically has a value of about 100 pF. The circuit models shown in FIGS. 5 and 6 are shown in the context of two types of electrodes disposed along rows and columns, X and Y axes, or any other suitable arrangement of drive and sense electrodes. For purposes of clarity and illustration, FIGS. 5 and 6 show the various types of capacitances associated with such axes with X and Y designations.

The various types of capacitances shown in FIGS. 5 and 6 are now described. In FIG. 5 (the "touched" case), $C_{xyt1}$ represents electrode overlap capacitance in the presence of a finger touch, $C_{xfgt1}$ represents X electrode to electric field ground capacitance in the presence of a finger touch, $C_{yfgt1}$ represents Y electrode to electric field ground capacitance in the presence of a finger touch, $C_{fx1}$ represents finger to X electrode capacitance, $C_{fy1}$ represents finger to Y electrode capacitance, and $C_{hb}$ represents human body capacitance. In FIG. 6, $C_{xyn}$ represents X-Y electrode overlap capacitance in absence of a finger touch, $C_{xfgn}$ represents X electrode to field ground capacitance in the absence of a finger touch, and $C_{yfgn}$ represents Y electrode to field ground capacitance in the absence of a finger touch. As will be seen by referring to FIGS. 5 and 6, the various capacitance designations are similar.

Note that pixel resistivity is not taken in to account in the circuit models of FIGS. 5 and 6. Neglecting resistivity in such circuit models is valid for touchscreen operation at appropriate frequencies or charging times, which by way of example may range between about 3 microseconds and about 100 microseconds. Such appropriate frequencies or charging times permit sufficient time for the completion of charge redistribution in the touchscreen and the associated acquisition or sensing electronics each time after drive signal potentials have changed value. To describe touchscreen resistivity effects, the capacitances associated with each touch sensor pixel should be connected to terminals with resistors rather then ideal conductors. In one embodiment, one drive electrode from among a plurality of drive electrodes in the touchscreen is connected to a voltage source. Sense electrodes of the touchscreen are connected to sensor readout electronics (or acquisition or sense circuitry).

In a capacitive touchscreen, a user's finger represents an electrode connected to an electric field ground. Due to the widespread use of switching power supply converters to power capacitive touchscreens, the electric potential of a readout electronic ground terminal (or system ground) may vary significantly in periodic or not strictly periodic fashion with respect to the voltage associated with the electric field ground. The electric field voltage or potential is assumed to be zero at infinity. Variation of the system ground voltage with respect to the electric field ground voltage may produce significant interference in mutual capacitance signals acquired from a capacitive touchscreen, which we refer to here generically as electromagnetic interference. Such interference may be considered as "noise" due to the generally unknown phase relationships between a readout sampling clock a switching power supply converter clock. Other contributions to electromagnetic interference can include "noise" coupling associated with undesired charges induced by various ambient or environmental sources that may be asynchronous with respect to capacitive touchscreen drive signals.

Figure 7:
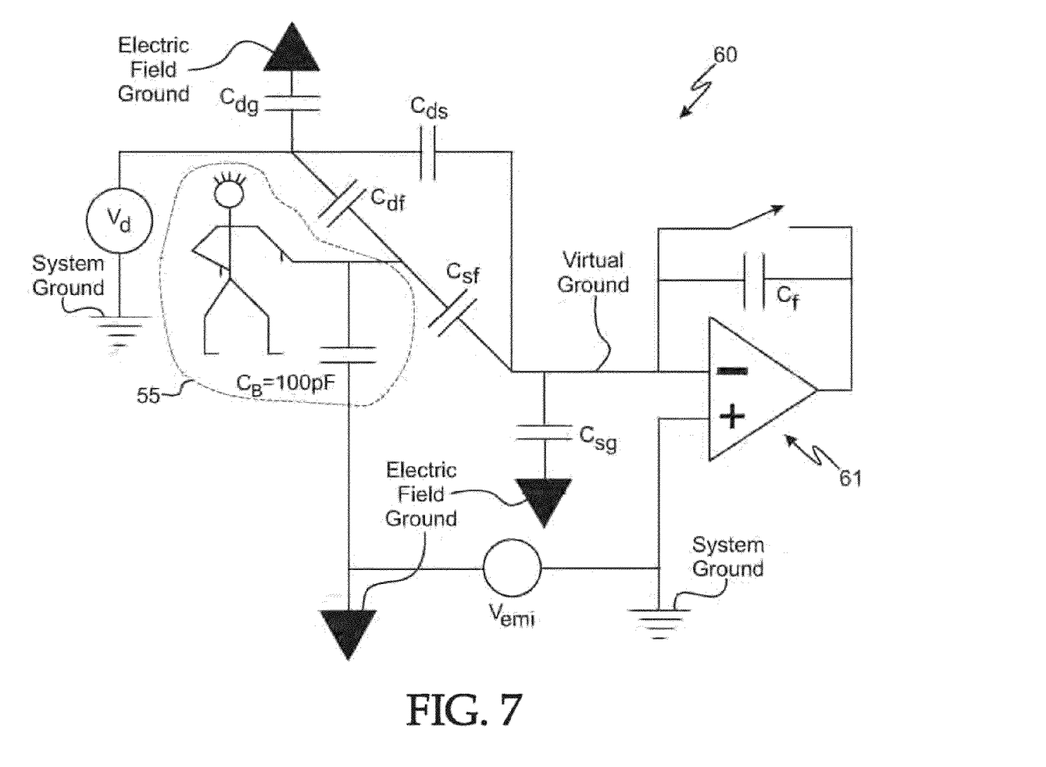
FIG. 7 shows a schematic illustration of a touch sensor pixel circuit with a charge integrator circuit.

FIG. 7 shows a circuit model representing a single touch sensor pixel touched by a human finger. The pixel is charged by a voltage drop $V_d$ between the drive electrode and the system ground. Note that the electric field ground is designated as a solid black triangle. One terminal of human body capacitor is connected to the electric field ground and the other terminal is connected to the finger electrode. Electromagnetic interference is described by the voltage source $V_{emi}$ connected between the system ground and the electric field ground. Upon reset of charge integrator circuit 61, initial conditions are established at charge integrator circuit 61's virtual ground, and electric charge is collected in feedback capacitor $C_f$ which is induced by charging circuit 60 by voltage sources $V_d$ and $V_{emi}$. An expression for the ratio of the charges caused by charging capacitor $C_f$ by voltage sources $V_d$ and $V_{emi}$; is shown in equation (10 below, where the designations of FIGS. 5 and 6 are employed, and the capacitance of the touch sensor pixel in touched and untouched states is represented by $C_{dst}$ and $C_{dsnt}$, respectively. Note that $C_{sf}$ represents sense electrode to finger capacitance in a touched state.

$$\frac{Q_{signal}}{Q_{gemi}} \cong \frac{V_d(C_{dsnt} - C_{dst})}{V_{gemi}C_{sf}} \quad (1)$$

Equation (1) shows that the signal-to-noise ratio (where electromagnetic interference or "EMI" represents noise) is directly proportional to, the ratio of the drive and EMI signal amplitudes. As a result, the signal-to-noise ratio many be improved by increasing the amplitude of the drive signal. Below are described means and methods for effecting electronic readout through the sense electrodes and corresponding acquisition or sensing circuitry where the signal-to-noise ratio is improved without increasing the amplitude of the drive signal. These techniques increase noise immunity without dissipating excessive power through the use of high amplitude drive circuitry.

Owing to the superposition principle, the drive electrode voltage $V_d$ and the system ground voltage $V_{emi}$ both independently contribute to the output signal provided by charge integrator circuit 61. These contributions are uncorrelated provided $V_d$ and $V_{emi}$ are uncorrelated. The signals sampled at the output of charge integrator circuit 61 occurring at certain repeated voltage values provided by the drive electrode contain approximately equal electromagnetic interference signal contributions, so long as the sample interval is much shorter than variation of the electromagnetic interference signals over time.

A circuit configured to sample the output signal of charge integrator circuit 61 for equal charging times with the voltage $V_d$ being held in alternating high and low states ($V_{drh}$ and $V_{drl}$, respectively) is now discussed. Referring to FIGS. 5 and 6, and neglecting the limited open loop gain of the charge integrator circuit amplifier, an expression for the signal-to-noise ratio at the output of charge integrator circuit 61 is derived as follows:

$$\left(\frac{S}{N}\right)_t \cong \frac{|V_{drh} - V_{drl}|\left(C_{xyt1} + \frac{C_{fx1}C_{fy1}}{C_{fx1} + C_{fy1} + C_{hb}}\right)}{V_{emi\_pk-pk}\left(C_{xfgt1} + \frac{C_{hb}C_{fx1}}{C_{fx1} + C_{fy1} + C_{hb}}\right)} \quad (2)$$

where the designation for the EMI amplitude peak to peak value is $V_{emi\_pk-pk}$. The numerator of equation (2) defines a charge difference caused by the drive potential $V_d$ in high and low states. The denominator of equation (2) defines the difference between minimum and maximum collected by charge integrator circuit 61 due to EMI. The transfer function of charge integrator circuit 61 is the same for both the EMI harmonic and drive signals, and thus drops out of equation (2).

Under no touch conditions a similar expression for the signal-to-noise ratio using the designations of FIGS. 5 and 6 may be obtained:

$$\left(\frac{S}{N}\right)_n \cong \frac{|V_{drh} - V_{drl}|C_{xyn}}{V_{emi\_pk-pk}C_{xfgn}} \quad (3)$$

Figure 8:
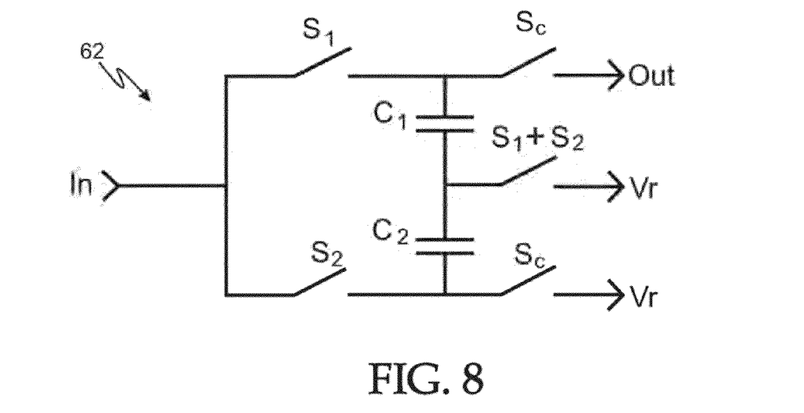
FIG. 8 shows one embodiment of a switched capacitance filtering circuit.
Figure 9:
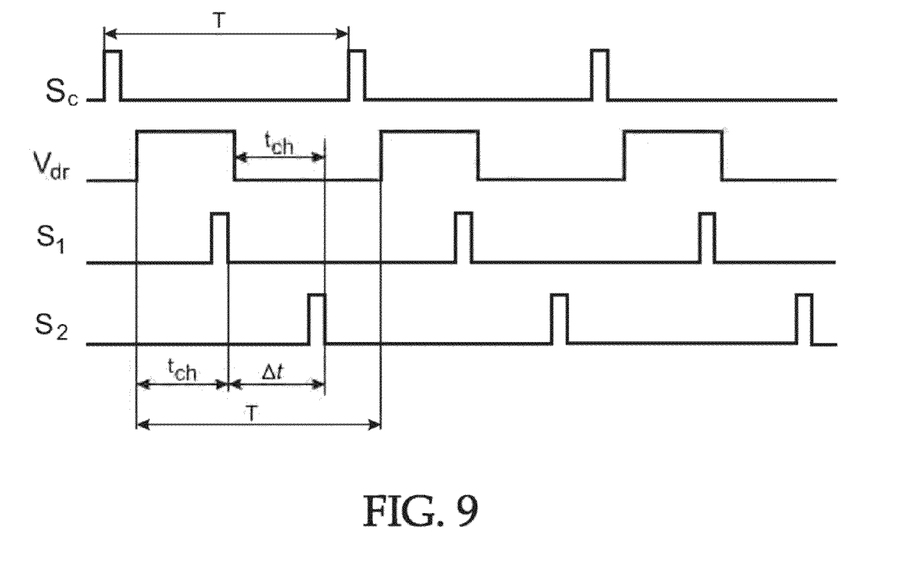
FIG. 9 shows one embodiment of a timing control sequence for the circuit of FIG. 8.

One embodiment of a switched capacitance filtering circuit 62 configured to perform correlated sampling is shown in FIG. 8; where the symbol '+' designates a logical OR operation for switching circuitry control signals. At different levels of the drive signal amplitude ($V_{drn}$ and $V_{drl}$), capacitors $C_1$ and $C_2$ in switched capacitance filtering circuit 62 are charged by the signal provided by the output of charge integrator circuit 61 of FIG. 7. The command sequence used to control switched capacitance filtering circuit 62 is shown in FIG. 9. Note that switches $S_1$ and $S_2$ are closed during the logical high state.

One expression describing the EMI signal spectrum after the correlated sampling circuit has performed its operations is as follows:

$$V_{emi\_cs}(\omega) = V_{emi\_out}(\omega)\exp[-j\omega\Delta t] - V_{emi\_out}(\omega) \quad (4)$$

where $\Delta t$ is the time interval between samples, and $V_{emi\_out}$ is the EMI signal presented at the output of charge integrator circuit 61

When equation (2) is extended to include the effects of correlated sampling in the frequency domain, it becomes equation (5):

$$\left(\frac{S}{N}\right)_{tcs} = \frac{|V_{drh} - V_{drl}|\left(C_{xyt1} + \frac{C_{fx1}C_{fy1}}{C_{fx1} + C_{fy1} + C_{hb}}\right)}{2V_{emi0}\left|\sin\left[\frac{\pi f_0}{(1/\Delta t)}\right]\right|\left(C_{xfgt1} + \frac{C_{hb}C_{fx1}}{C_{fx1} + C_{fy1} + C_{hb}}\right)} \quad (5)$$

where $V_{emi0}$ is the amplitude of the EMI harmonic at terminal '$f_g$' terminal, and $f_0$ is the harmonic oscillation frequency. While the signal-to-noise ratio of equation (5) is still proportional to the ratio of the drive signal amplitude differences with respect to the EMI amplitude peak-to-peak amplitude differences, it now includes the ratio of the harmonic frequency to the inverse time intervals between samples described by a sine function. The filtering property of this additional term is used to attenuate EMI harmonic noise at certain frequency ranges, and thus permits filtering of EMI.

Figure 10:
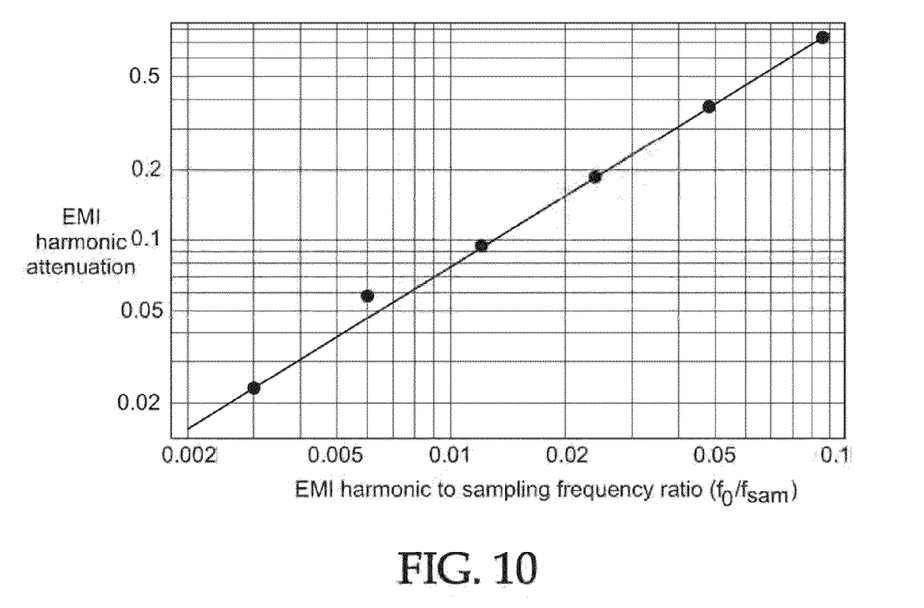
FIG. 10 shows circuit simulation and analytical results obtained at lower frequencies for one embodiment of a charge integrator circuit and corresponding switched capacitance-filtering circuit.

FIG. 10 shows simulation results obtained using circuits 50 and 52 of FIGS. 5 and 6, respectively, where the pixel circuits of FIGS. 5 and 6 were driven by a voltage source connected to 'Y' pixel terminal and sensed or read with a charge integrator circuit connected to an 'X' pixel terminal, followed by the output of charge integrator circuit 61 being provided to switched capacitance filtering circuit 62 of FIG. 8. The electric field ground ($f_g$) terminal (or the second plate of human body self capacitance) was connected to system ground through a voltage source $V_{emi}$, which generated harmonic oscillations at frequencies representing the EMI signal. The sensing or readout circuit included a switched capacitance filtering circuit similar to that shown in FIG. 8. An ideal operational amplifier with an open loop gain of 10K was used in charge integrator circuit 61, while charge integrator circuit feedback capacitor $C_f$ was assigned a value of 10 pF. Ideal switches were closed when logical high signals were applied to the switch drive terminals. The virtual ground of charge integrator circuit 61 was connected to a voltage source of 0.9V. Other simulation parameters were as follows: $C_{xyn}$=1.13 pF; $C_{xyt1}$=0.876 pF; $C_{fy1}$=1.396 pF; $C_{fx1}$=1.132 pF; $C_{hb}$=100 pF. Switches $S_1$ and $S_2$ permitted charging of the sampling capacitors in switched capacitance filtering circuit 62 using voltages provided at the output of charge integrator circuit 61 having equally spaced timing $t_{ch}$ associated with rising from $V_{drl}$ to $V_{drh}$ and falling from $V_{drl}$ to $V_{drh}$ at the respective edges of the pulses associated with drive voltage $V_d$. The sampling intervals employed were of the same length for each capacitor (0.9 μsec.). Switching to the hold mode occurred before the drive potential level changed value. The resulting difference between the signals held in the capacitors of switched capacitance filtering circuit 62 was presented to output thereof for further processing when the logical high of the $S_c$ signal occurred. Note that the $S_c$ signal was also used to reset charge integrator circuit 61. The drive signal was configured to change between $V_{drl}$ and $V_{drh}$=1.8V.

Figure 11:
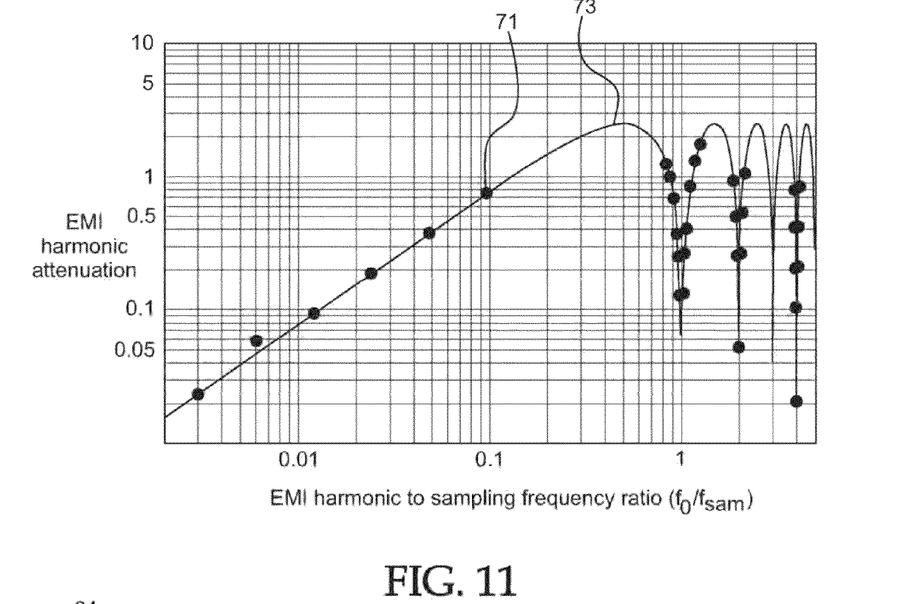
FIG. 11 shows circuit simulation and analytical results obtained at a wider range of frequencies for one embodiment of a charge integrator circuit and corresponding switched, capacitance filtering circuit.

Referring to FIG. 10, it will be seen that the obtained simulator results (represented by the solid black dot data points of FIG. 10) are in excellent agreement with the analytical results derived from equation (5) (represented by the solid continuous curve of FIG. 10) in equation (6) as follows:

$$\left(\frac{N}{S}\right)_{nor} = \frac{V_{ripple\_pk-pk}/<V_{out}>}{V_{emi\_pk-pk}/|V_{drh}-V_{drl}|} = \quad (6)$$

$$\frac{2\left|\sin\left[\frac{\pi f_0}{(1/\Delta t)}\right]\right|\left(C_{xfgt1}+\frac{C_{hb}C_{fx1}}{C_{fx1}+C_{fy1}+C_{hb}}\right)}{\left(C_{xyt1}+\frac{C_{fx1}C_{fy1}}{C_{fx1}+C_{fy1}+C_{hb}}\right)}$$

where the right part of equation (6) represents the normalized harmonic EMI attenuation obtained using equation (5) and plotted in FIG. 10 as a continuous curve, while simulated circuit results using time domain SPECTRE™ program simulations are shown in the solid black dots. Owing to the filtering resulting from the correlated sampling effected by switched capacitance filtering circuit 62, the EMI contribution at frequencies substantially lower than $f_{sam}$ (or $1/\Delta t$) is attenuated as shown in FIG. 10. The resulting EMI harmonic attenuation was also discovered to be substantially phase independent. FIG. 11 shows an expanded plot, over a wider range of frequencies, of the simulation and analytical results shown in FIG. 10. FIG. 11 shows that the transfer function of switched capacitance filtering circuit 62 is similar to a comb notch filter, with filtering-properties governed by the time intervals between samples.

Figure 12:
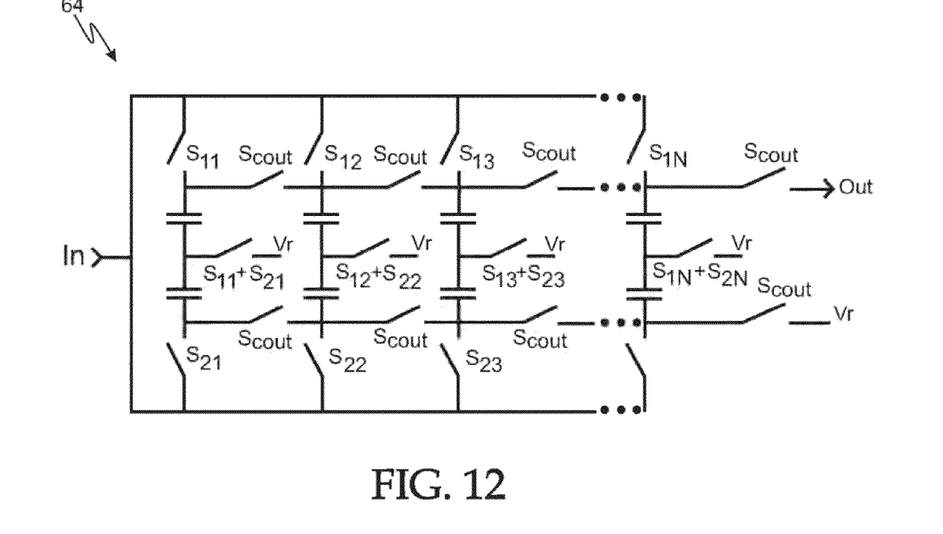
FIG. 12 shows another embodiment of a switched capacitance filtering circuit.
Figure 13:
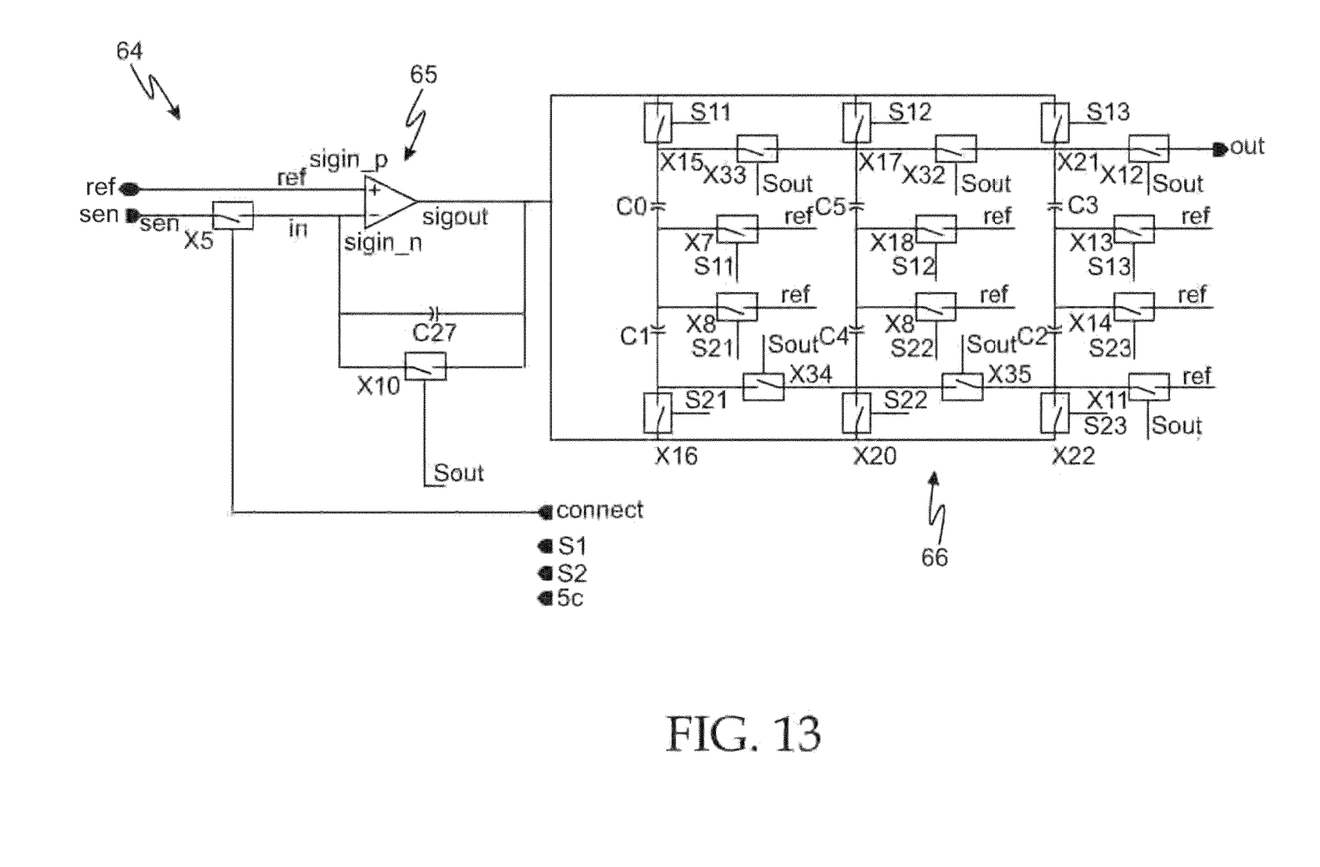
FIG. 13 shows still another embodiment of a switched capacitance filtering circuit.

Modified versions of switched capacitance filtering circuit 62 of FIG. 8, switched capacitance filtering circuits 64, are shown in FIGS. 12 and 13, where additional pairs of capacitors are employed to filter EMI. These additional pairs of capacitors permit adjustment of the resulting filtering transfer function at frequencies that are both lower and higher than the inverse time interval between adjoining samples. FIG. 12 illustrates a switched capacitance filtering circuit 64 having N pairs of capacitors arranged in parallel with respect to one another. FIG. 13 illustrates a switched capacitance filtering circuit 64 having three pairs of capacitors arranged in parallel with respect to one another.

A switched capacitance filtering circuit which combines correlated sampling with signal averaging at the output thereof permits improved EMI attenuation at certain frequencies, which may be controlled by the parameters of the sensing or acquisition circuit. The principal such filtering parameters are N, T/$\Delta t$, and $\Delta t$, more about which is now said. Equation (7) shown below is derived in a similar fashion to equation (6) for the case where multiple samples are averaged at the outputs of switched capacitance filtering circuits 64 shown in FIGS. 12 and 13. Note that with respect to equation (6), equation (7) contains two additional parameters: N, or the number of pairs of sampled signal differences, and T/$\Delta t$, the ratio of sample difference repetition times to the time interval between the samples. Equation (7), then, is as follows:

$$\left(\frac{N}{S}\right)_{nor} = \left|\frac{2\sin\left[\frac{\pi f_0}{f_{sam}}\right]\sin\left[\frac{\pi f_0}{f_{sam}}\frac{T}{\Delta t}N\right]}{N\sin\left[\frac{\pi f_0}{f_{sam}}\frac{T}{\Delta t}\right]}\right|\frac{\left(C_{xfgt1}+\frac{C_{hb}C_{fx1}}{C_{fx1}+C_{fy1}+C_{hb}}\right)}{\left(C_{xyt1}+\frac{C_{fx1}C_{fy1}}{C_{fx1}+C_{fy1}+C_{hb}}\right)} \quad (7)$$

Figure 14:
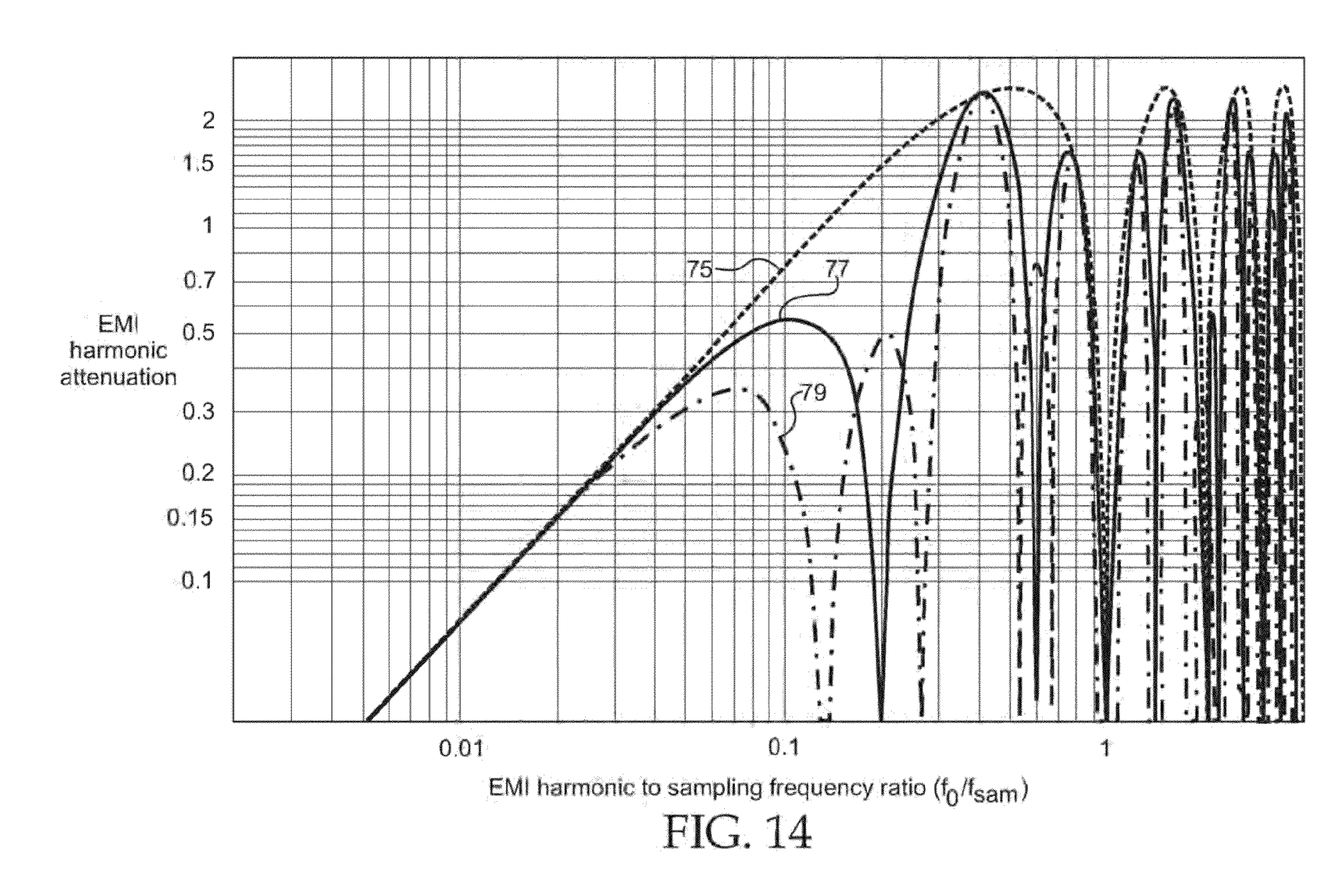
FIG. 14 shows analytical results obtained for three different embodiments of a charge integrator circuit and corresponding switched capacitance filtering circuit.

By increasing N, the number of notches in the transfer function is increased. Varying T/$\Delta t$ permits the range of frequencies over which filtering occurs to be matched to the panel charge time (e.g., 3 to 100 microseconds). The time interval between samples, $\Delta t$, can be varied to permit lower or higher bandwidths of signals to be filtered.

to FIG. 14 shows analytical transfer function results derived from equation (7) for switched capacitance filtering circuit 64 having one pair of capacitors (represented by curve 75), two pairs of capacitors (represented, by curve 77), and three pairs of capacitors (represented by curve 79). The simulated results shown in FIG. 14 were obtained using control time sequence parameters corresponding to $\Delta t$=6 μsec. and T/$\Delta t$=2.5, with a drive cycle period of 15 μsec.

It will now be seen that charge integrator circuit 61 in combination with switched capacitance filtering circuits 62 or 64 results in an improved signal-to-noise ratio (or ratio of the desired sensed mutual capacitance signal to the undesired EMI signal) in a capacitive sensor readout circuit without the need to increase the amplitude of the drive signal. The various embodiments of the charge integrator and switched capacitance filtering circuits described herein permit an improvement in noise immunity without requiring the excessive power levels typically associated with high amplitude drive circuitry, and moreover result in boosting signal-to-noise ratios during early stages of signal processing.

In one embodiment, and as shown in switched capacitance filtering circuit 62 of FIG. 8, first and second capacitors $C_1$ and $C_2$ are electrically connected in series, and switched capacitance filtering circuit 62 comprises first and second input switches $S_1$ and $S_2$ corresponding to the first and second capacitors, respectively. First input switch $S_1$ is configured to close and charge first capacitor $C_1$ when the first integrated signal corresponding to the high state drive signal is delivered thereto while second switch $S_2$ is open. Second input switch $S_2$ is configured to close and charge second capacitor $C_2$ when the second integrated signal corresponding to the low state drive signal is delivered thereto while first switch $S_1$ is open. A reference voltage $V_r$ is switchably and operably connected between first and second capacitors $C_1$ and $C_2$ by a third switch (designated by $S_1+S_2$, which is a control signal). Such third switch is configured to close to provide reference voltage $V_r$ to switched capacitance filtering circuit 62 when first switch $S_1$ is closed, or when second switch $S_2$ is closed. Note that such third switch must be closed when first switch $S_1$ is closed, or when second switch $S_2$ is closed. Switches $S_1$ and $S_2$ are never closed at the same time. Reference voltage $V_r$ is switchably and operably connected to second capacitor $C_2$ by a fourth switch (designated as $S_c$ at the bottom right-handmost switch of FIG. 8, where $S_c$ is a control signal), and the switched capacitance filtering circuit further comprises an output switch (also designated as $S_c$, and which is also a control signal, but at the top right-hand-most switch of FIG. 8). The fourth switch and the output switch are configured to close when first and second switches $S_1$ and $S_2$ are open, but after first and second capacitors $C_1$ and $C_2$ have been charged with the first and second integrated signals and the third switch has been closed and opened.

In other embodiments, switched capacitance filtering circuit of FIG. 8 may be extended to include additional pairs of capacitors as shown in circuits 64 of FIGS. 12 and 13, where each of switched capacitance filtering circuits 64 comprises a plurality of pairs of first and second capacitors, each pair of first and second capacitors being electrically connected in series, the pairs being arranged in parallel with respect to one another, and where only one pair of capacitors is charged during a single cycle of high and low drive states, and the pairs are charged with first and second integrated signals corresponding to sequential cycles of high and low drive states. The output signals provided by such switched capacitance filtering circuits 64 are representative of an averaged or enhanced signal-to-noise mutual capacitance.

Moreover, touchscreen system 110 or processor 100 preferably comprises a reset circuit configured to drain charge remaining on each of the plurality of sense and drive electrodes after a sense cycle has been completed. In one the processor is an integrated circuit. By way of example, processor 100 may be an integrated circuit that is one of a microprocessor, a controller, or an application specific integrated circuit (ASIC), and may be formed using a CMOS or BiCMOS process.

Note that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the sensing, circuit might be located on or in the hand rest of a keyboard and engaged by the heel of the user's hand. Furthermore, various embodiments of capacitive touchscreen system 110 and capacitive touchscreen 90 are not limited in scope to drive electrodes disposed in rows and sense electrodes disposed in is columns. Instead, rows and columns are interchangeable in respect of sense and drive electrodes. Various embodiments various embodiment of capacitive touchscreen system 110 and capacitive touchscreen 90 are also capable of operating in conjunction with a stylus, such that stylus touches on touchscreen 90 are detected. System 110 and touchscreen 90 may further be configured to permit the detection of both of finger touches and stylus touches.

Note further that included within the scope of the present invention are methods of making and having made the various components, devices and systems described herein. For example, according to various embodiments there is provided a method of reducing electromagnetic interference in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devices brought into proximity thereto, a system ground being associated with the capacitive touchscreen system, an electric field ground being associated with the one or more fingers or touch devices and the touchscreen, the method comprising sequentially driving the first plurality of electrodes with alternating high and low state drive signals, sensing the mutual capacitances associated with each of the second plurality of electrodes during the high and low state drive signals with a charge integrator circuit for each sense circuit, for each charge integrator circuit, providing first and second integrated signals corresponding to the high and low state drive signals, respectively, to a switched capacitance filtering circuit, sampling and storing in first and second capacitors, respectively, of the switched capacitance filtering circuit the first and second integrated signals, and providing, with the switched capacitance filtering circuit, an output signal representative of the mutual capacitance of the one of the second plurality of electrodes corresponding to the sense circuit and further having an electromagnetic interference voltage between the system ground and the electric field ground substantially filtered therefrom by the switched capacitance filtering circuit.

Such a method may further include one or more steps of electrically connecting the first and second capacitors in series; providing in the switched capacitance filtering circuit first and second input switches corresponding to the first and second capacitors, respectively; configuring the first input switch to close and charge the first capacitor when the first integrated signal corresponding to the high state drive signal is delivered thereto while the second switch is open; configuring the second input switch to close and charge the second capacitor when the second integrated signal corresponding to the low state drive signal is delivered thereto while the first switch is open, switchably and operably connecting a reference voltage between the first and second capacitors by a third switch; configuring the third switch to close and provide the reference voltage to the switched capacitance filtering circuit when the first or second switch is closed; switchably and operably connecting the reference voltage to the second capacitor by a fourth switch and providing the switched capacitance filtering circuit with an output switch; closing the fourth switch and the output switch when the first and second switches are open, but after the first and second capacitors have been charged with the first and second integrated signals and the third switch has been closed and opened; configuring the switched capacitance filtering circuit such that it comprises a plurality of pairs of first and second capacitors, each pair of first and second capacitors being electrically connected in series, the pairs being arranged in parallel with respect to one another; charging only one pair of capacitors during a single cycle of high and low drive states, the pairs being charged with first and second integrated signals corresponding to sequential cycles of high and low drive states; and providing an output signal from the switched capacitance filtering circuit that is representative of an averaged or enhanced signal-to-noise mutual capacitance.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variation and modifications of the foregoing embodiments of the present invention not set forth explicitly herein will nevertheless fall within the scope of the present invention.

I claim:

1. A capacitive touchscreen system, comprising:
a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devices brought into proximity thereto;

at least one drive circuit operably connected to the first plurality of electrodes and configured to provide drive signals of high and low states thereto;

a plurality of sense circuits, one each of the sense circuits being operably connected to corresponding ones of the second plurality of electrodes;

a system ground associated with the capacitive touchscreen system;

an electric field ground associated with the one or more fingers or touch devices and the touchscreen;

wherein each of the sense circuits comprises a charge integrator circuit and a switched capacitance filtering circuit, the charge integrator circuit being configured to receive input signals provided by a corresponding one of the second plurality of electrodes and to provide integrated signals to the switched capacitance filtering circuit, the switched capacitance filtering circuit being configured to sample and store in first and second capacitors, respectively, first and second integrated signals delivered thereto by the charge integrator circuit where the first integrated signal corresponds to the high state drive signal, and the second integrated signal corresponds to the low state drive signal, the switched capacitance filtering circuit being configured to provide an output signal representative of the mutual capacitance of the one of the second plurality of electrodes corresponding to the sense circuit and further having an electromagnetic interference voltage between the system ground and the electric field ground substantially filtered therefrom by the switched capacitance filtering circuit.

2. The capacitive touchscreen system of claim 1, wherein the first and second capacitors are electrically connected in series.

3. The capacitive touchscreen system of claim 2, wherein the switched capacitance filtering circuit comprises first and second input switches corresponding to the first and second capacitors, respectively.

4. The capacitive touchscreen system of claim 3, wherein the first input switch is configured to close and charge the first capacitor when the first integrated signal corresponding to the high state drive signal is delivered thereto while the second switch is open.

5. The capacitive touchscreen system of claim 4, wherein the second input switch is configured to close and charge the second capacitor when the second integrated signal corresponding to the low state drive signal is delivered thereto while the first switch is open.

6. The capacitive touchscreen system of claim 5, wherein a reference voltage is switchably and operably connected between the first and second capacitors by a third switch.

7. The capacitive touchscreen system of claim 6, wherein the third switch is configured to close to provide the reference voltage to the switched capacitance filtering circuit when the first or second switch is closed.

8. The capacitive touchscreen system of claim 7, wherein the reference voltage is switchably and operably connected to the second capacitor by a fourth switch, and the switched capacitance filtering circuit further comprises an output switch.

9. The capacitive touchscreen system of claim 8, wherein the fourth switch and the output switch are configured to close when the first and second switches are open, but after the first and second capacitors have been charged with the first and second integrated signals and the third switch has been closed and opened.

10. The capacitive touchscreen system of claim 1, wherein the switched capacitance filtering circuit comprises a plurality of pairs of first and second capacitors, each pair of first and second capacitors being electrically connected in series, the pairs being arranged in parallel with respect to one another.

11. The capacitive touchscreen system of claim 10, wherein only one pair of capacitors is charged during a single cycle of high and low drive states, and the pairs are charged with first and second integrated signals corresponding to sequential cycles of high and low drive states.

12. The capacitive touchscreen system of claim 11, wherein the output signal provided by the switched capacitance filtering circuit is representative of an averaged or enhanced signal-to-noise mutual capacitance.

13. A processor for a capacitive touchscreen system comprising a touchscreen comprising a first plurality of electrically conductive drive electrodes arranged in rows or columns, and a second plurality of electrically conductive, sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devices brought into proximity thereto, a system ground being associated with the capacitive touchscreen system, an electric field ground being associated with the one or more fingers or touch devices and the touchscreen, the processor comprising:

at least one drive circuit operably connected to the first plurality of electrodes and configured to provide drive signals of high and low states thereto;

a plurality of sense circuits, one each of the sense circuits being operably connected to corresponding ones of the second plurality of electrodes;

wherein each of the sense circuits comprises a charge integrator circuit and a switched capacitance filtering circuit, the charge integrator circuit being configured to receive input signals provided by a corresponding one of the second plurality of electrodes and to provide integrated signals to the switched capacitance filtering circuit, the switched capacitance filtering circuit being configured to sample and store in first and second capacitors, respectively, first and second integrated signals delivered thereto by the charge integrator circuit where the first integrated signal corresponds to the high state drive signal, and the second integrated signal corresponds to the low state drive signal, the switched capacitance filtering circuit being configured to provide an output signal representative of the mutual capacitance of the one of the second plurality of electrodes corresponding to the sense circuit and further having an electromagnetic interference voltage between the system ground and the electric field ground substantially filtered therefrom by the twitched capacitance filtering circuit.

14. The processor of claim 13, wherein the first and second capacitors are electrically connected in series.

15. The processor of claim 14, wherein the switched capacitance filtering circuit comprises first and second input switches, corresponding to the first and second capacitors, respectively.

16. The processor of claim 15, wherein the first input switch is configured to close and charge the first capacitor when the first integrated signal corresponding to the high state drive signal is delivered thereto while the second switch is open.

17. The processor of claim 16, wherein the second input switch is configured to close and charge the second capacitor when the second integrated signal corresponding to the low state drive signal is delivered thereto while the first switch is open.

18. The processor of claim 17, wherein a reference voltage is switchably and operably connected between the first and second capacitors by a third switch.

19. The processor of claim 18, wherein the third switch is configured to close to provide the reference voltage to the switched capacitance filtering circuit when the first or second switch is closed.

20. The processor of claim 19, wherein the reference voltage is switchably and operably connected to the second capacitor by a fourth switch, and the switched capacitance filtering circuit further comprises an output switch.

21. The processor of claim 20, wherein the fourth switch and the output switch are configured to close when the first and second switches are open, but after the first and second capacitors have been charged with the first and second integrated signals and the third switch has been closed and opened.

22. The processor of claim 13, wherein the switched capacitance filtering circuit comprises a plurality of pairs of first and second capacitors, each pair of first and second capacitors being electrically connected in series, the pairs being arranged in parallel with respect to one another.

23. The processor of claim 22, wherein only one pair of capacitors is charged during a single cycle of high and low drive states, and the pairs are charged with first and second integrated signals corresponding to sequential cycles of high and low drive states.

24. The processor of claim 23, wherein the output signal provided by the switched capacitance filtering circuit is representative of an averaged or enhanced signal-to-noise mutual capacitance.

25. The processor of claim 13, further comprising a reset circuit configured to drain charge remaining on each of the second plurality of electrodes after a sense cycle has been completed.

26. The processor of claim 13, wherein the processor is an integrated circuit.

27. The processor of claim 26, wherein the integrated circuit is one of a microprocessor, a controller or an application specific integrated circuit (ASIC).

28. The processor of claim 26, wherein the integrated circuit is formed using a CMOS or BiCMOS process.

29. A method of reducing electromagnetic interference in a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, such mutual capacitances changing in the presence of one or more fingers or touch devices brought into proximity thereto, a system ground being associated with the capacitive touchscreen system, an electric field ground being associated with the one or more fingers or touch devices and the touchscreen, the method comprising:
sequentially driving the first plurality of electrodes with alternating high and low state drive signals;
sensing the mutual capacitances associated with each of the second plurality of electrodes during the high and low state drive signals with a charge integrator circuit for each sense circuit;
for each charge integrator circuit, providing first and second integrated signals corresponding to the high and low state drive signals, respectively, to a switched capacitance filtering circuit;
sampling and storing in first and second capacitors, respectively, of the switched capacitance filtering circuit the first and second integrated signals;
providing, with the switched capacitance filtering circuit, an output signal representative of the mutual capacitance of the one of the second plurality of electrodes corresponding to the sense circuit and further having an electromagnetic interference voltage between the system ground and the electric field ground substantially filtered therefrom by the switched capacitance filtering circuit.

30. The method of claim 29, wherein the first and second capacitors are electrically connected in series.

31. The method of claim 30, wherein the switched capacitance filtering circuit comprises first and second input switches corresponding to the first and second capacitors, respectively.

32. The method of claim 31, wherein the first input switch closes and charges the first capacitor when the first integrated signal corresponding to the high state drive signal is delivered thereto while the second switch is open.

33. The method of claim 32, wherein the second input switch closes and charges the second capacitor when the second integrated signal corresponding to the low state drive signal is delivered thereto while the first switch is open.

34. The method of claim 33, wherein a reference voltage is switchably and operably connected between the first and second capacitors by a third switch.

35. The method of claim 34, wherein the third switch closes to provide the reference voltage to the switched capacitance filtering circuit when the first or second switch is closed.

36. The method of claim 35, wherein the reference voltage is switchably and operably connected to the second capacitor by a fourth switch, and the switched capacitance filtering circuit further comprises an output switch.

37. The method of claim 36, wherein the fourth switch and the output switch close when the first and second switches are open, but after the first and second capacitors have been charged with the first and second integrated signals and the third switch has been closed and opened.

38. The method of claim 29, wherein the switched capacitance filtering circuit comprises a plurality of pairs of first and second capacitors, each pair of first and second capacitors being electrically connected in series, the pairs being arranged in parallel with respect to one another.

39. The method of claim 38, wherein only one pair of capacitors is charged during a single cycle of high and low drive states, and the pairs are charged with first and second integrated signals corresponding to sequential cycles of high and low drive states.

40. The method of claim 39, wherein the output signal provided by the switched capacitance filtering circuit is representative of an averaged or enhanced signal-to-noise mutual capacitance.

* * * * *